Patented May 5, 1925.

1,536,381

UNITED STATES PATENT OFFICE.

EDWIN C. ECKEL, OF WASHINGTON, DISTRICT OF COLUMBIA.

PROCESS OF MAKING IRON AND CEMENT.

No Drawing.  Application filed January 24, 1924. Serial No. 688,349.

*To all whom it may concern:*

Be it known that I, EDWIN C. ECKEL, a citizen of the United States, residing at Washington, in the District of Columbia, have invented certain new and useful Improvements in Processes of Making Iron and Cement, of which the following is a specification.

This invention relates to a process of producing low-sulphur iron and hydraulic cement, the latter resulting from the slag incident to the iron production.

When certain iron ores were used for the production of metallic iron, the slags produced were necessarily high in silica and almost all of the sulphur in the ore charge was carried into the metallic iron product, and altho these processes resulted in the production of slags available for cements the silica was detrimental thereto. The value of low-silica cements has been demonstrated because they harden with extreme rapidity and by reason of the relatively low-line are resistant to sea water and other agents of chemical attack.

By means of the present process it is possible to produce metallic iron from ordinary ores, together with a slag which can be converted into low silica cement whereby the slag so produced has such a high commercial value that it is possible to extend the process to include ores carrying 20% or even less of iron. Therefore by reason of the two commercial products ores may be treated which have hitherto been incapable of profitable reduction.

In performing my process I fuse in a suitable furnace a mixture of iron ore or iron bearing minerals of almost any quality or grade, and limestone or other calcareous material, in a charge so proportioned as to yield a slag carrying less than 20% of silica and iron oxide together and from 30 to 45% lime, or lime and magnesia together, the remainder being made up of other oxides and bases depending on the nature of the ore, the gangue and the fluxing material used in the charge.

A typical mix might be made by mixing one ton of a low grade iron ore, such for example as a Cuban ore at the present too low in iron for use, containing iron oxide 45%, silica 2%, alumina 10%, alkalis, sulphur, phosphorus etc. 3% and combined water etc. 40%, with ⅕ ton of limestone, which might contain 96% lime carbonate. Fused in a blast furnace with coke, this mixture would yield about 560 lbs. pig iron and about 500 lbs. of slag within the proportions above specified.

When a sulphurous or low grade iron ore as above is fused or smelted in the manner indicated, metallic iron will separate at the bottom of the furnace and is drawn off for further treatment. The resulting slag is also drawn off separately and after cooling is ground into powder, yielding a cement low in silica and containing sufficient alumina to give it quick setting properties, and this without the subsequent addition of lime or other material. A certain amount of iron will also be present in the slag and cement. In part, this will be in the form of metallic iron globules in the slag, which are preferably removed after cooling by magnetic or other means, in order to save wear on the grinding machinery.

The quantity of iron produced will ordinarily be much less than the quantity of slag, but since both products are valuable a commercially practicable and profitable result is obtained, and the excess of slag acts to desulphurize the iron more efficiently than in ordinary practice.

The quantity of calcareous material provided by this process will be sufficient to supply the necessary lime in the slag to produce a hydraulic cement without any necessity for the subsequent addition of lime or other similar material; in other words, a cement complete in itself and containing say between 30 and 45% of lime.

I claim:

1. The process of producing iron and alumina cement, comprising fusing a mixture of iron bearing ore low in silica and calcareous materials in such proportions that the resulting slag will contain a relatively high proportion of alumina and less than 15% of silica, separating the reduced metallic iron and the slag, and cooling and grinding the latter.

2. The process of producing iron and alumina cement, comprising fusing a mixture of aluminous iron ore low in silica and limestone, in such proportions that the slag will contain approximately equal quantities of alumina and lime and less than 15% of silica, separating the resulting metallic iron and slag, and cooling and grinding the latter.

3. The process of producing iron and cement, comprising fusing a mixture of aluminous low silica iron ore with calcareous material, separating the reduced metallic iron and the slag, and grinding and cooling the latter.

In testimony whereof, I affix my signature.

EDWIN C. ECKEL.